(12) United States Patent
Goldberg

(10) Patent No.: US 7,127,214 B2
(45) Date of Patent: Oct. 24, 2006

(54) USER PERCEPTION OF WIRELESS IMPROVEMENT TECHNOLOGY

(75) Inventor: Steven Jeffrey Goldberg, Downingtown, PA (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 10/731,653

(22) Filed: Dec. 9, 2003

(65) Prior Publication Data

US 2005/0064865 A1     Mar. 24, 2005

Related U.S. Application Data

(60) Provisional application No. 60/505,098, filed on Sep. 23, 2003.

(51) Int. Cl.
*H04B 17/00* (2006.01)

(52) U.S. Cl. .............. 455/67.7; 455/67.11; 455/115.1; 455/115.4; 455/226.1; 455/226.4

(58) Field of Classification Search .............. 455/425, 455/67.11, 226, 219, 571, 115, 67.7, 67.16, 455/67.15, 67.13, 63.1, 230–231, 423, 140, 455/115.4, 226.4, 226.1–226.3, 561–562.1, 455/418–420; 702/57, 69; 375/224; 379/21, 379/22, 27.03

See application file for complete search history.

(56) References Cited

U.S. PATENT DOCUMENTS

| | | | | |
|---|---|---|---|---|
| 5,946,612 | A * | 8/1999 | Johansson ................... | 455/446 |
| 6,131,021 | A * | 10/2000 | Lussenhop et al. ....... | 455/226.1 |
| 6,925,301 | B1 * | 8/2005 | Hill .......................... | 455/67.11 |
| 2003/0064744 | A1 * | 4/2003 | Zhang et al. .............. | 455/67.1 |
| 2004/0192290 | A1 * | 9/2004 | Muthuswamy et al. .. | 455/67.11 |
| 2005/0118959 | A1 * | 6/2005 | Johan et al. ............. | 455/67.11 |

* cited by examiner

Primary Examiner—Charles N Appiah
Assistant Examiner—Olivia Marie Marsh
(74) Attorney, Agent, or Firm—Volpe and Koenig, P.C.

(57) ABSTRACT

A method for indicating performance enhancements in a wireless transmit/receive unit (WTRU) to a user in a wireless communication system begins with operating a radio link to the WTRU with a performance enhancement active. The operating results with the performance enhancement active are measured. The radio link to the WTRU is operated with the performance enhancement inactive and the operating results with the performance enhancement inactive are measured. The measurements with the performance enhancement active and the performance enhancement inactive are compared, and a display indicator on the WTRU is prepared and displayed, showing the performance difference of the WTRU when the performance enhancement is active and inactive.

32 Claims, 4 Drawing Sheets

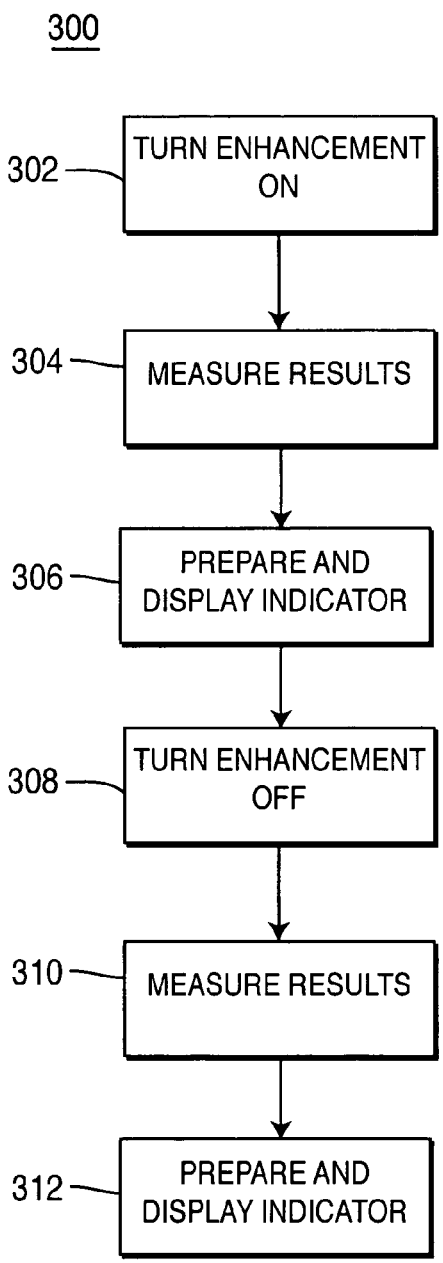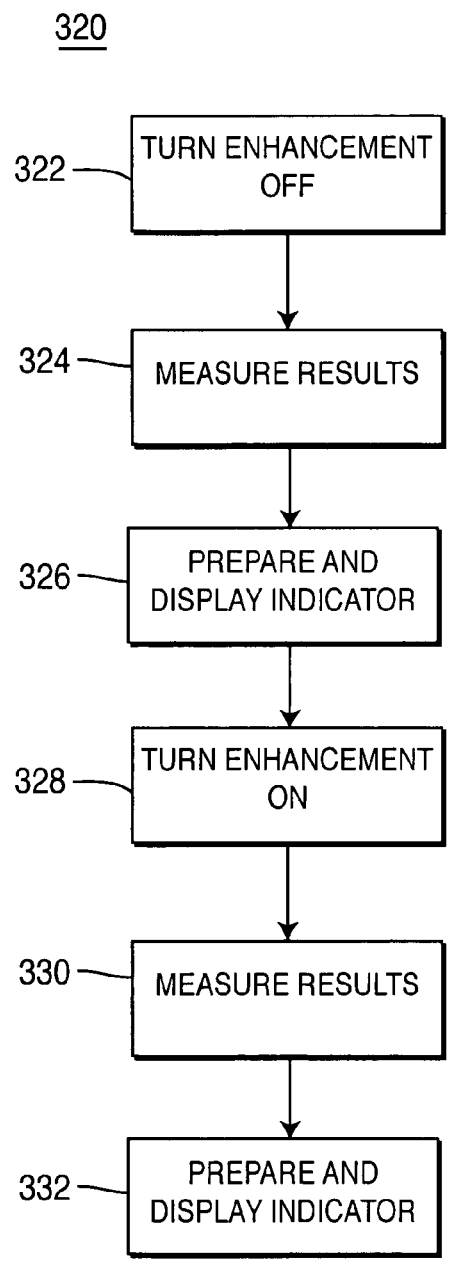
*FIG. 3a*  *FIG. 3b*

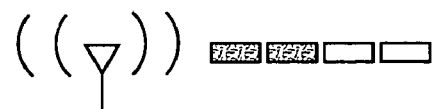
FIG. 4a
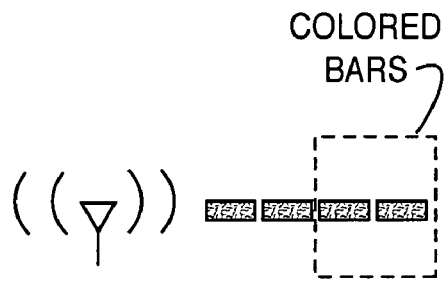
FIG. 4b
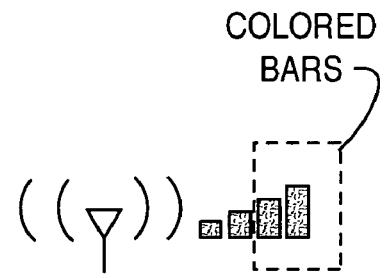
FIG. 4c
1010101
FIG. 4d
10 [30] Seconds
FIG. 4e

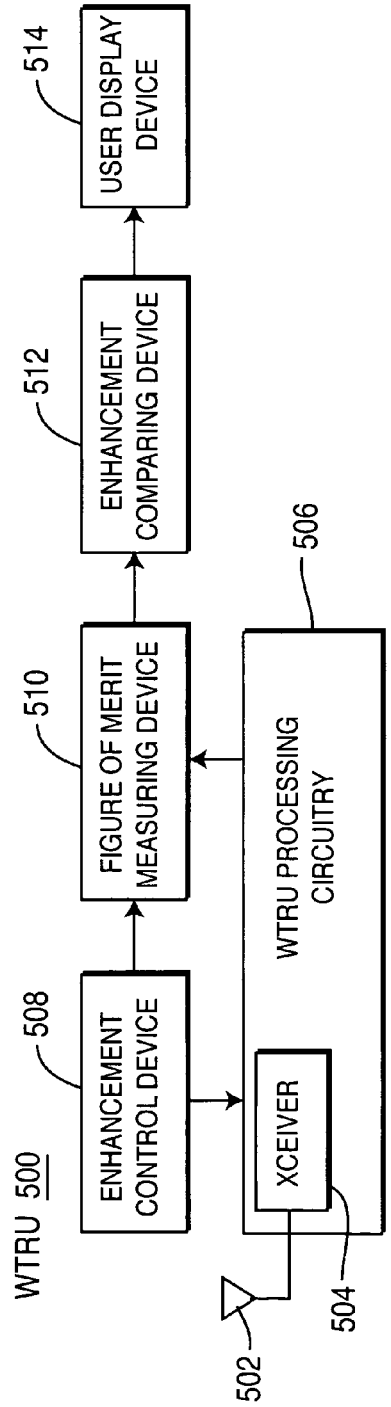

USER PERCEPTION OF WIRELESS IMPROVEMENT TECHNOLOGY

CROSS REFERENCE TO RELATED APPLICATIONS

This application claims priority from U.S. Provisional Application No. 60/505,098, filed Sep. 23, 2003, which is incorporated by reference as if fully set forth herein.

FIELD OF INVENTION

The present invention relates to wireless communication systems, and more specifically, the present invention relates to improved user perception of wireless improvement technology.

BACKGROUND

The wireless communications industry is investigating many means to improve the general areas of coverage and system capacity, as well as other characteristics of the networks and devices associated with it. Currently, service providers can review the benefits of enhancements by way of monitoring points and programs. The users, however, receive no specific indications of the benefits of enhancement technologies. Therefore, one area of development, for example, involves wireless transmit/receive units (WTRUs) which may include, but are not limited to, a user equipment, a mobile station, a fixed or mobile subscriber unit, a pager, or any other type of device capable of operating in a wireless environment.

The addition of some technology to improve the performance of a WTRU needs to be justified in the minds of the users. Otherwise, a user may not be willing to incur the costs associated with a particular enhancement technology. Antenna array technology, for example, comes in a number of forms and provides many enhancements. Dramatic gains in operation may sometimes be obvious to a user, such as a data download time that takes seconds instead of tens of seconds. In general, however, gains are often more subtle, such as coverage in a previously unavailable area or a moderate data rate increase of, for example, twenty percent.

Another important issue is user misconceptions regarding delays that are a result of a data source and not a radio frequency (RF) link. Such misconceptions can be detrimental to both the user and the service provider if WTRUs are maligned or returned for allegedly not living up to expectations.

Accordingly, it is desirable to users that a WTRU having a particular enhancement technology is providing superior performance over WTRUs without such technology.

SUMMARY

A method for indicating performance enhancements in a wireless transmit/receive unit (WTRU) to a user in a wireless communication system begins with operating a radio link to the WTRU with a performance enhancement active. Next, the operating results with the performance enhancement active are measured. Then, the radio link to the WTRU is operated with the performance enhancement inactive and the operating results with the performance enhancement inactive are measured. The measurements with the performance enhancement active and the performance enhancement inactive are compared, and a display indicator on the WTRU is prepared and displayed, showing the performance difference of the WTRU when the performance enhancement is active and inactive.

A method for indicating performance enhancements in a wireless transmit/receive unit (WTRU) to a user in a wireless communication system according to another embodiment of the present invention begins by measuring the characteristics of a received signal at the WTRU with a performance enhancement enabled. A gain value is calculated based upon the performance difference in the WTRU between when the performance enhancement is enabled and not enabled, and a display indicator is prepared and displayed on the WTRU based upon the gain value.

A method for indicating performance enhancements in a wireless transmit/receive unit (WTRU) to a user in a wireless communication system according to a third embodiment of the present invention begins with activating a performance enhancement in the WTRU. The operating results with the performance enhancement active are measured, and a display indicator is prepared and displayed on the WTRU showing the performance value with the performance enhancement active. Next, the performance enhancement is turned off and the operating results with the performance enhancement inactive are measured. A display indicator is prepared and displayed on the WTRU showing the performance value with the performance enhancement inactive.

A method for indicating performance enhancements in a wireless transmit/receive unit (WTRU) to a user in a wireless communication system in accordance with a fourth embodiment of the present invention begins with deactivating a performance enhancement in the WTRU. Next, the operating results with the performance enhancement inactive are measured and a display indicator is prepared and displayed on the WTRU showing the performance value with the performance enhancement inactive. Then, the performance enhancement is turned on and the operating results with the performance enhancement active are measured. A display indicator is prepared and displayed on the WTRU showing the performance value with the performance enhancement active.

A handset for use in a wireless communication system constructed in accordance with the present invention includes activating means for activating and deactivating a performance enhancement in the handset; measuring means for measuring operating results of the handset with the performance enhancement active and the performance enhancement inactive; and display means for displaying an indicator on the handset, the indicator showing operating results of the handset with the performance enhancement active and the performance enhancement inactive.

A wireless communication system constructed in accordance with the present invention includes a handset and a base station. The handset includes activating means for activating and deactivating a performance enhancement in the handset, and display means for displaying an indicator on the handset. The indicator shows operating results of the handset with the performance enhancement active and the performance enhancement inactive. The base station includes measuring means for measuring operating results of the handset with the performance enhancement active and the performance enhancement inactive.

Another embodiment of a wireless communication system constructed in accordance with the present invention includes a handset and a base station. The handset includes display means for displaying an indicator on the handset. The base station includes extrapolating means for extrapolating operating results of the handset if the handset was capable of a performance enhancement. The indicator shows the extrapolated operating results of the handset with the performance enhancement and the operating results of the handset without the performance enhancement.

BRIEF DESCRIPTION OF THE DRAWINGS

A more detailed understanding of the invention may be had from the following description of preferred embodiments, given by way of example, and to be understood with reference to the accompanying drawings, in which:

FIGS. 3a and 3b are flowcharts showing additional alternate methods for calculating and displaying an indicator in accordance with the present invention;

FIGS. 4a–4e are examples of visual displays in accordance with the present invention; and FIGS. 5a and 5b are simplified block diagrams of embodiments of the present invention.

DETAILED DESCRIPTION OF THE PREFERRED EMBODIMENTS

The means for improving performance in wireless transmit/receive units (WTRUs) are numerous. By way of example, a short list includes diversity, beamforming, multi-spatial layering, and coding. It is inherent that a "performance enhancement" only improves existing performance of a WTRU and the term does not extend to include technology which enables or facilitates the fundamental performance of a WTRU. Generally, the present invention provides an indication to a user regarding the gain that a WTRU is obtaining from using some enhancement technology.

The invention may enable and disable one or more of the enhancement technologies, and measure and record the performance factors of interest in each operational mode. Alternatively, the invention may leave an enhancement technology enabled to keep robust operation running, and interpolate the gain being achieved for a performance metric being presented to the user.

The nature of the application running and the sophistication of the user will dictate what performance metric should be displayed. The metric may be fixed in the case of a WTRU, for example, to signal strength. In the case of modems, the bit rate may be suitable for most people. More sophisticated users may find bit error rate or block error rate more useful. Very sophisticated users may want to display other figures of merit, such as signal-to-noise ratio or paths being utilized.

Figure 1:
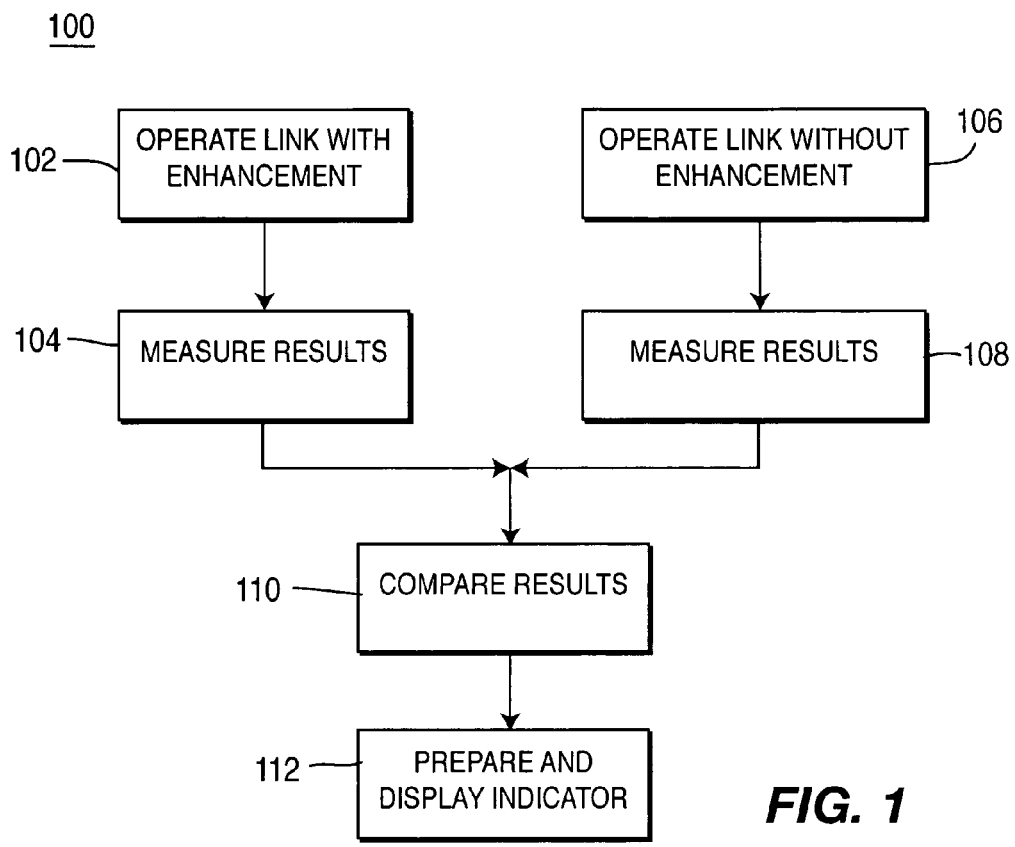
FIG. 1 is a flowchart showing a method for calculating and displaying an indicator in accordance with the present invention.

There are a number of ways to calculate the indicator. The most accurate way is to operate the link for a predetermined period of time both with and without the enhancement, and have the indicators proportional to the actual results. This method 100 is shown in FIG. 1. The radio link is operated with the enhancement active (step 102) and the radio link is measured to obtain results with the enhancement active (step 104). In order to make the comparison, the radio link is also operated without the enhancement (step 106) and the radio link is measured to obtain results with the enhancement inactive (step 108). Either pair of steps 102, 104 and 106, 108 can be performed first; the ordering of the pairs does not matter. After results are obtained from the radio link with the enhancement being both active and inactive, the respective results are compared (step 110) and a display indicator is prepared and displayed (step 112).

However, the method 100 would be a detrimental approach if the time required to perform the measurements 104, 108 is significant compared to the user's required operation of the link. In most cases, the method 100 would only be used when the system and unit found the RF resources to be underutilized or when the user forced the measurement.

The order of the calculation of the measurement with and without the enhancement is not significant. It is more a question of whether the measurements are performed with similar or the same data streams, and if the RF and device conditions (e.g., the orientation between receiver and transmitter) are the same during each test. There is another option, which is to run with the enhancement most of the time, and run the without enhancement benchmark only occasionally when there is a significant change in the receive characteristics of the signal, or on a periodic basis.

Figure 2:
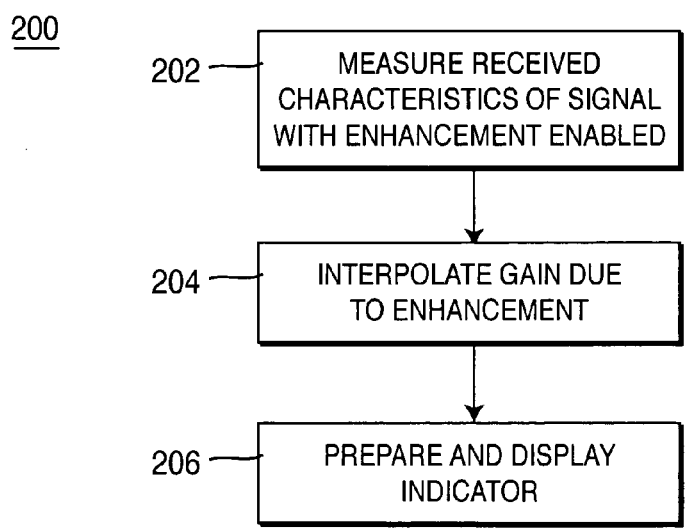
FIG. 2 is a flowchart showing an alternate method for calculating and displaying an indicator in accordance with the present invention.

The more commonly used method 200 is shown in FIG. 2, where the WTRU and/or the network (depending upon which is the sender and which is the receiver) measures the received characteristics of the signal with the enhancement technology enabled (step 202), and from these measurements interpolates the gain due to the enhancement (step 204). Then the display indicator is calculated and displayed (step 206).

The interpolated gain could be an estimate based on a simple formula with stored coefficients. The equipment would measure some basic characteristics of the RF data path, and/or alternatively be passed these measurements by the infrastructure or other device it is conversing with. This information would then be used to select the closest applicable coefficients for the formula. Alternately, the measured information could be compared to equivalent metrics stored in a table with expected associated gains. The closest corresponding figure stored for the gain would then be chosen. Alternately a mathematical interpolation between two measured table metrics could be used. If the characteristics of the RF data path are outside of the stored values, a mathematical extrapolation is calculated.

The data populating the table can be determined by tests of other systems, in simulations, or a combination of both sources. Another means for populating the table would be to perform the measurements during low utilization periods of the network. These measurements could be invoked by the network as it deems the resources are available, or based on a time of day known to be of low utilization. The latter situation could be at the discretion of the device or the infrastructure as appropriate. A variation would be to initially populate the table via external measurements, and then modify the results with real-time measurements as they become available.

Rather than indicating both the on and off conditions together, a mechanism may be provided to switch between operational states with and without the enhancement technology. The switching means may flip between the states, or cause an automatically timed change from one indication to the other. The indication may be accompanied by an indication as to whether the enhancement technology is being shown in the display or not.

A flowchart illustrating the foregoing switching process is shown in FIGS. 3a and 3b. It is noted that FIGS. 3a and 3b respectively show different ordering of the measurements, beginning with the enhancement turned on and off. Referring to FIG. 3a, a method 300 begins by turning an enhancement on (step 302). The results with the enhancement active are measured (step 304) and the display indicator is prepared and displayed on the WTRU (step 306). Next, the enhancement is turned off (step 308), the results with the enhancement inactive are measured (step 310), and the display indicator is prepared and displayed on the WTRU (step 312).

Referring now to FIG. 3b, a method 320 begins by turning an enhancement off (step 322). The results with the enhancement inactive are measured (step 324) and the display indicator is prepared and displayed on the WTRU (step 326). Next, the enhancement is turned on (step 328), the results with the enhancement active are measured (step 330), and the display indicator is prepared and displayed on the WTRU (step 332).

Each system enhancement can be enabled via user preferences for each enhancement or by the user selecting a preconfigured option, wherein the WTRU selectively enables the enhancements to maximize system performance. As one skilled in the art would understand, numerous other methods for enabling the system enhancements are possible. In actual device deployment, it is possible that sometimes the WTRU will operate better without an enhancement technology. This is because there can be circumstances where the conditions necessary for the enhancement do not exist or the improvement technique is detrimental to the communications.

An example of a scenario where the conditions do not exist is in connection with Layered Space, where providing additional communication channel paths requires multipath propagation. In line of sight only links, there is no natural multipath. So turning on the Layered Space technology to encode and decode the channel does not improve the data rate. Rather, it just consumes battery power with the significant additional processing.

An example of a situation in which using an enhancement would be detrimental to the communications is in low signal-to-noise ratio channels, where the error rate can greatly reduce the effective data rate of the communications. Adding the enhancement of error correction coding reduces the raw data rate, but increases the effective data rate. However, if the signal-to-noise ratio is high, the effective data rate may be at or very close to the raw data rate. Adding error correction coding reduces the raw data rate without a significant improvement of the effective data rate. The net effect in this case could actually be a decrease in the effective rate.

FIG. 4a is an example of a visual display that may be utilized. The bars indicate the signal strength received by the device. The solid bars indicate the signal strength without the enhancement techniques. The hollow bars indicate the additional received signal strength due to the enhancement technology. There are of course numerous alternative ways of displaying the same signal strength with and without enhancement, such as those shown in FIGS. 4b (using colored bars) and 4c (using vertically oriented and colored bars). It is noted that the particular display used to communicate the information to the user can vary. For example, a colon between the two groups of bars or underlining the enhancement bars could be used.

Other icons could be used to show data rates (e.g., 1010) or error rates (e.g., 1?0?), as shown in FIG. 4d. The binary numbers shown in FIG. 4d represent an arbitrary data stream. The display can also be related to the download data rate, as shown in FIG. 4e, which shows the download time with the enhancement active ("10" for a 10 second active download time in FIG. 4e) and the download time with the enhancement inactive ("[30]" for a 30 second inactive download time in FIG. 4e).

Additional visual cues may be used, such as enclosing the value with the enhancement inactive in square brackets (as shown in FIG. 4e) or by using different colors to indicate whether the enhancement is active or not. If the terminal has a display area of sufficient size, numeric values may be more useful such as, for example, "Off 78 kbs:On 144 kbs". Color coding the numbers or underlining the enhancement portion are possible ways of differentiating the indicators. For coverage, an example could be a picture of an antenna with two different size circles surrounding it. The outer circle being with the enhancement and the inner circle without the enhancement. Colors or hash marks could be used to highlight the differences. Other indicator means may also be used; for example, a physical indicator such as Braille or raised indicators, or sound that is varied by volume and/or duration.

It is important to note that the present invention may be implemented not only in a WTRU, but also in the context of an overall wireless communication system. For example, the WTRU and other components in a wireless communication system may be configured to indicate to users whether they are receiving the benefit of a particular enhancement technology. Such wireless communication systems may be any type of communication system, and in one embodiment may include, for example, a radio network controller, at least one Node B, and at least one WTRU. It should be noted that a Node B includes, but is not limited to, a base station, a site controller, an access point, or other interfacing device in a wireless environment.

FIGS. 5a and 5b are simplified block diagrams of embodiments of the present invention. In FIG. 5a, a WTRU 500 receives and transmits signals using its transceiver 504 and antenna/antenna array 502. The transceiver 504 is one component in the WTRU processing circuitry 506. An enhancement control device 508 can selectively turn on and turn off the enhancement by controlling the WTRU processing circuitry 506. The enhancement control device 508 is also in communication with a figure of merit measuring device 510 to coordinate taking the measurements when the enhancement is operating and when it is not. An enhancement comparing device 512 compares the figures of merit with and without the enhancement. A result of the comparison is displayed on the user display device 514.

In FIG. 5b, the WTRU 500 receives and transmits signals using its transceiver 504 and antenna/antenna array 502. An enhancement control device 508 selectively turns on and off the enhancement by controlling the WTRU processing circuitry 506. At the wireless network 526/base station 528, signals are received and transmitted using a transceiver 520 and antenna/antenna array 518. A figure of merit device 522 measures the performance while the enhancement is operating and while the enhancement is not operating. An enhancement comparing device 524 compares the figure of merit measurements with and without the enhancement. A result of the comparison is sent to the WTRU 500 via the air interface 516. The WTRU transceiver 504 provides the comparison signal to the user display device 514 for display.

There is also the possibility of the enhancement being disabled, and without doing measurements, the user could be provided with an extrapolation of what the gain would look like if it was turned on. Another possibility is that the device the user presently has is not even capable of using the improvement technique. But as part of a sales job, the service or device provider wants the user to know what the gain would be if he or she obtained a device capable of the technique. For example, the user is in an area where the service is marginal, and complains to the system or device provider. The equipment provider tells the user they will download the extrapolation code to their device so they can see an estimate of the improvement if they upgrade to the newer technology.

While the present invention has been described in terms of the preferred embodiment, other variations are within the scope of the invention.

What is claimed is:

1. A method for indicating performance enhancements in a wireless transmit/receive unit (WTRU) to a user in a wireless communication system, wherein a performance enhancement improves existing performance of the WTRU, the method comprising the steps of:
 (a) operating a radio link to the WTRU with a performance enhancement active;
 (b) measuring the operating results with the performance enhancement active;
 (c) operating a radio link to the WTRU with the performance enhancement inactive;
 (d) measuring the operating results with the performance enhancement inactive;
 (e) comparing the measurements with the performance enhancement active and the performance enhancement inactive; and
 (f) preparing and displaying a display indicator on the WTRU showing the performance difference of the WTRU when the performance enhancement is active and inactive.

2. The method according to claim 1, wherein steps (a) and (b) are performed before steps (c) and (d).

3. The method according to claim 1, wherein steps (c) and (d) are performed before steps (a) and (b).

4. A method for indicating performance enhancements in a wireless transmit/receive unit (WTRU) to a user in a wireless communication system, wherein a performance enhancement improves existing performance of the WTRU, the method comprising the steps of:
 measuring the characteristics of a received signal at the WTRU with a performance enhancement enabled;
 calculating a gain value based upon the performance difference in the WTRU between when the performance enhancement is enabled and not enabled; and
 preparing and displaying a display indicator on the WTRU based upon the gain value.

5. A method for indicating performance enhancements in a wireless transmit/receive unit (WTRU) to a user in a wireless communication system, wherein a performance enhancement improves existing performance of the WTRU, the method comprising the steps of:
 activating a performance enhancement in the WTRU;
 measuring the operating results with the performance enhancement active;
 preparing and displaying a display indicator on the WTRU showing the performance value with the performance enhancement active;
 turning the performance enhancement off;
 measuring the operating results with the performance enhancement inactive; and
 preparing and displaying a display indicator on the WTRU showing the performance value with the performance enhancement inactive.

6. A method for indicating performance enhancements in a wireless transmit/receive unit (WTRU) to a user in a wireless communication system, wherein a performance enhancement improves existing performance of the WTRU, the method comprising the steps of:
 deactivating a performance enhancement in the WTRU;
 measuring the operating results with the performance enhancement inactive;
 preparing and displaying a display indicator on the WTRU showing the performance value with the performance enhancement inactive;
 turning the performance enhancement on;
 measuring the operating results with the performance enhancement active; and
 preparing and displaying a display indicator on the WTRU showing the performance value with the performance enhancement active.

7. A method for indicating performance enhancements to a user in a wireless communication system, the wireless communication system including a wireless transmit/receive unit (WTRU) and a base station (BS), wherein a performance enhancement improves existing performance of the WTRU, the method comprising the steps of:
 activating an enhancement in the WTRU;
 transmitting signals from the BS to the WTRU;
 measuring the operating results at the BS;
 deactivating the enhancement in the WTRU;
 transmitting signals from the BS to the WTRU;
 measuring the operating results at the BS;
 comparing the measurement results at the BS; and
 displaying the comparison results to the user via the WTRU.

8. A method for indicating performance enhancements to a user in a wireless communication system, the wireless communication system including a wireless transmit/receive unit (WTRU) and a base station (BS), wherein a performance enhancement improves existing performance of the WTRU, the method comprising the steps of:
 transmitting signals from the BS to the WTRU;
 measuring the operating results at the BS with an enhancement inactive at the WTRU;
 activating the enhancement in the WTRU;
 transmitting signals from the BS to the WTRU;
 measuring the operating results at the BS;
 comparing the measurement results at the BS; and
 displaying the comparison results to the user via the WTRU.

9. A handset for use in a wireless communication system, comprising:
 activating means for activating and deactivating a performance enhancement in said handset;
 measuring means for measuring operating results of said handset with the performance enhancement active and the performance enhancement inactive; and
 display means for displaying an indicator on said handset, said indicator showing operating results of said handset with the performance enhancement active and the performance enhancement inactive, wherein the performance enhancement improves existing performance of the WTRU.

10. The handset according to claim 9, further comprising:
 comparing means for comparing the measured operating results of said handset with the performance enhancement active and the performance enhancement inactive; and
 wherein said indicator shows the comparison results.

11. The handset according to claim 9, wherein said indicator includes differently labeled elements to distinguish between operating results with the performance enhancement active and the performance enhancement inactive.

12. The handset according to claim 11, wherein the elements of said indicator are labeled in different colors.

13. The handset according to claim 11, wherein the elements of said indicator are labeled in different type styles.

14. The handset according to claim 11, wherein the elements of said indicator are labeled in different fonts.

15. The handset according to claim 11, wherein the elements of said indicator are separated by a marker.

16. The handset according to claim 9, wherein said measuring means only measures the operating results of said handset with the performance enhancement inactive.

17. The handset according to claim 16, further comprising extrapolating means for extrapolating the operating results of said handset based upon the measured operating results of said handset with the performance enhancement inactive.

18. A wireless communication system, comprising:
a handset, including:
  activating means for activating and deactivating a performance enhancement in said handset, wherein the performance enhancement improves existing performance of the WTRU; and
  display means for displaying an indicator on said handset, said indicator showing operating results of said handset with the performance enhancement active and the performance enhancement inactive; and
a base station, including:
  measuring means for measuring operating results of said handset with the performance enhancement active and the performance enhancement inactive.

19. The wireless communication system according to claim 18, wherein said base station further includes
  comparing means for comparing the measured operating results of said handset with the performance enhancement active and the performance enhancement inactive; and
  wherein said indicator shows the comparison results.

20. The wireless communication system according to claim 18, wherein said base station further includes extrapolating means for extrapolating the operating results of said handset based upon the measured operating results of said handset with the performance enhancement inactive.

21. The wireless communication system according to claim 20, wherein said extrapolating means bases the extrapolation on the measured operating results of said handset without the performance enhancement.

22. The wireless communication system according to claim 18, wherein said indicator includes differently labeled elements to distinguish between operating results with the performance enhancement active and the performance enhancement inactive.

23. The wireless communication system according to claim 22, wherein the elements of said indicator are labeled in different colors.

24. The wireless communication system according to claim 22, wherein the elements of said indicator are labeled in different type styles.

25. The wireless communication system according to claim 22, wherein the elements of said indicator are labeled in different fonts.

26. The wireless communication system according to claim 22, wherein the elements of said indicator are separated by a marker.

27. A wireless communication system, comprising:
a handset, including:
  display means for displaying an indicator on said handset; and
a base station, including:
  extrapolating means for extrapolating operating results of said handset if said handset was capable of a performance enhancement, wherein the performance enhancement improves existing performance of the WTRU;
said indicator showing the extrapolated operating results of said handset with the performance enhancement and the operating results of said handset without the performance enhancement.

28. The wireless communication system according to claim 27, wherein said indicator includes differently labeled elements to distinguish between operating results with the performance enhancement active and the performance enhancement inactive.

29. The wireless communication system according to claim 28, wherein the elements of said indicator are labeled in different colors.

30. The wireless communication system according to claim 28, wherein the elements of said indicator are labeled in different type styles.

31. The wireless communication system according to claim 28, wherein the elements of said indicator are labeled in different fonts.

32. The wireless communication system according to claim 28, wherein the elements of said indicator are separated by a marker.

* * * * *